United States Patent [19]

Nawata

[11] Patent Number: 5,708,682
[45] Date of Patent: Jan. 13, 1998

[54] DEMODULATOR CONTROL SYSTEM AND A RECEIVER CAPABLE OF QUICKLY ACQUIRING A DESIRED CARRIER WAVE

[75] Inventor: Hizuru Nawata, Tokyo, Japan

[73] Assignee: NEC Corporation, Japan

[21] Appl. No.: 578,861

[22] Filed: Dec. 27, 1995

[30] Foreign Application Priority Data

Dec. 28, 1994 [JP] Japan .................... 6-328645

[51] Int. Cl.$^6$ .................... H04L 7/00; H04L 27/06
[52] U.S. Cl. .................... 375/326; 375/340; 375/365; 370/514
[58] Field of Search .................... 375/260, 362, 375/365, 366, 326, 327, 316, 340, 354; 370/321, 337, 516, 514, 503, 509

[56] References Cited

U.S. PATENT DOCUMENTS

| | | | |
|---|---|---|---|
| 5,007,088 | 4/1991 | Ooi et al. | 375/365 |
| 5,012,491 | 4/1991 | Iwasaki | 375/365 |
| 5,020,131 | 5/1991 | Isoe | 375/365 |
| 5,303,234 | 4/1994 | Kou | 370/459 |

FOREIGN PATENT DOCUMENTS 5336017  12/1993  Japan .

OTHER PUBLICATIONS

Nawata, et al., A Study for Demodulator Acquisition Scheme for a Small Capacity Transmission, Systems, Electronics, Information and Communication Engineers in Japan, Sat88–45, 1988.

*Primary Examiner*—Tesfaldet Bocure
*Attorney, Agent, or Firm*—Ostrolenk, Faber, Gerb & Soffen, LLP

[57] ABSTRACT

In a control system being provided with a local oscillator (42) and being for controlling a demodulating arrangement (43, 44, and 45) demodulating a desired one of modulated signals in accordance with a demodulating frequency, produced by a sweeping operation of the local oscillator, into a demodulated signal having a unique word and an identification number which are carried by the desired modulated signal, a unique word detecting circuit (47) detects the unique word to produce a unique word detection signal. A number comparing circuit (48) compares the identification number with a desired one of predetermined numbers to produce a number coincidence signal when the identification number coincides with the desired number. In response to presence and absence of each of the number coincidence and the unique word detection signals, an oscillator control circuit (49) controls the sweeping operation of the local oscillator.

10 Claims, 4 Drawing Sheets

DEMODULATOR CONTROL SYSTEM AND A RECEIVER CAPABLE OF QUICKLY ACQUIRING A DESIRED CARRIER WAVE

BACKGROUND OF THE INVENTION

This invention relates to a receiver for receiving modulated signals, transmitted by the use of a frequency division multiple access (FDMA) system, and to a demodulator control system for controlling operation of a demodulating arrangement included in the receiver.

There is known a communication system in which a plurality of carrier waves are assigned to a plurality of channels, modulated with transmission data signals by a digital modulation system, and then transmitted as modulated signals from a transmitter by an FDMA system using a single channel per carrier (SCPC) system. The modulated signals are received by a receiver including a demodulating arrangement which is for demodulating the modulated signals in frequency order into demodulated signals in the manner known in the art.

When the communication system is used as a satellite communication system in which communication is carried out at a relatively low bit rate, it has a disadvantage as will presently be described. It will be assumed as an ordinary case that a desired one of the modulated signals is demodulated by the demodulating arrangement. In the ordinary case, the demodulating arrangement is often locked to demodulate an undesired one of the modulated signals in the manner known in the art. As a result, the demodulating arrangement can not demodulate the desired modulated signal.

In order to avoid the above-mentioned disadvantage, an additional data signal is added to each of the transmission data signals and transmitted together. The additional data signal is for carrying an identification number specific to each of the channels or the carrier waves. The demodulating arrangement demodulates the additional data signal together with the transmission data signal to which the additional data signal. After the transmission data signal and the additional data signal are demodulated, they would also be called hereinafter a transmission data signal and an additional data signal.

After the demodulation is carried out as regards one of the modulated signals at the receiver with reference to a selected one of local oscillation frequencies, particular judgement is made as to whether or not the identification number is representative of a desired one of the carrier waves. If the identification number is not representative of the desired carrier wave, the demodulation is carried out with reference to another one of the local oscillation frequencies. Thus, until a desired carrier wave is received, a sweeping operation of the local oscillation frequencies is carried out in the manner known in Japanese Unexamined Patent Prepublication No. 336017 of 1993 by Susumu Otani.

In the above-mentioned conventional receiver or demodulator control system, the identification number is repeatedly inserted at a predetermined interval into a frame known in the art. The identification number is checked after frame synchronization is established in the receiver.

However, it takes a long time before the particular judgement is made as to coincidence with the desired carrier wave. This is because establishment of the frame synchronization takes a considerably long time. Upon incoincidence with the desired carrier wave, the sweeping operation must be carried out again to search a next or another carrier wave. Thus, it takes a long time to finally find the desired carrier wave.

SUMMARY OF THE INVENTION

It is an object of this invention to provide a demodulator control system and a receiver each of which is capable of quickly acquiring a desired carrier wave.

It is another object of this invention to provide a demodulator control system and a receiver of the type described, each of which is capable of reliably acquiring a carrier wave.

It is still another object of this invention to provide a demodulator control system and a receiver of the type described, each of which is capable of realizing a receiving device manufactured at a low cost.

Other objects of this invention will become clear as the description proceeds.

According to an aspect of this invention, there is provided a demodulator control system for controlling operation of demodulating means which is for demodulating each of a plurality of modulated signals in accordance with a demodulating frequency into a demodulated signal. The modulated signals are transmitted by the use of a frequency division multiple access system. The demodulator control system includes a local oscillator for carrying out a sweeping operation to successively produce, as the demodulating frequency, a plurality of local oscillation frequencies one at a time and sweeping control means for controlling the sweeping operation with reference to the demodulated signal. The demodulated signal carries a unique word and an identification number. In the control system, the sweeping control means comprises a number comparing circuit connected to the demodulating means for comparing the identification number with a desired one of predetermined numbers in response to the demodulated signal to produce a number coincidence signal when the identification number coincides with the desired one, a unique word detecting circuit connected to the demodulating means for detecting the unique word in response to the demodulated signal to produce a unique word detection signal, and an oscillator control circuit connected to the local oscillator, the number comparing circuit, and the unique word detecting circuit for controlling the sweeping operation in response to presence and absence of each of the number coincidence signal and the unique word detection signal.

According to another aspect of this invention, there is provided a receiver for receiving a plurality of modulated signals which are transmitted by the use of a frequency division multiple access system. The receiver includes a local oscillator for carrying out a sweeping operation to successively produce, as a demodulating frequency, a plurality of local oscillation frequencies one at a time, demodulating means for demodulating each of the modulated signals in accordance with the demodulating frequency into a demodulated signal, and sweeping control means for controlling the sweeping operation with reference to the demodulated signal. The demodulated signal carries a unique word and an identification number. In the receiver, the sweeping control means comprises a number comparing circuit connected to the demodulating means for comparing the identification number with a desired one of predetermined numbers in response to the demodulated signal to produce a number coincidence signal when the identification number coincides with the desired one, a unique word detecting circuit connected to the demodulating means for detecting the unique word in response to the demodulated signal to produce a unique word detection signal, and an oscillator control circuit connected to the local oscillator, the number comparing circuit, and the unique word detecting circuit for controlling the sweeping operation in response to presence and absence of each of the number coincidence signal and the unique word detection signal.

DESCRIPTION OF THE PREFERRED EMBODIMENT

Figure 1:
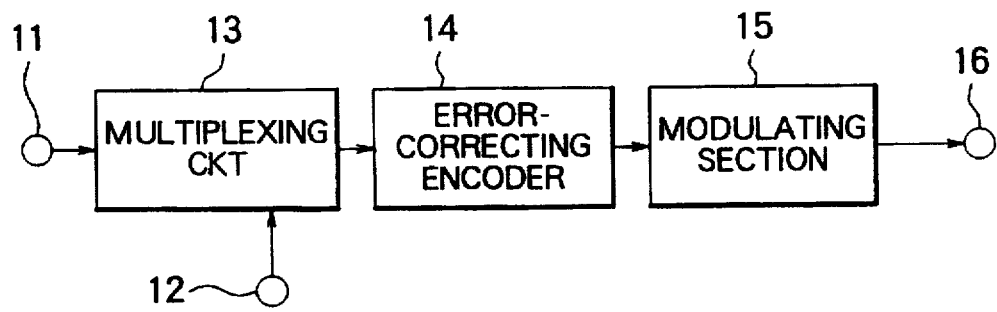
FIG. 1 is a block diagram of a transmitter.

Referring to FIG. 1, description will at first be made as regards a transmitter for use in a communication system relating to this invention.

The transmitter comprises a multiplexing circuit 13, an error-correcting encoder 14, and a modulator or a modulating section 15. The multiplexing circuit 13 is connected to first and second input terminals 11 and 12 and is supplied with transmission data through the first input terminal 11 and with unique words and identification numbers through the second input terminal 12. The unique words are well known in the art. The identification numbers are specific to carrier waves, respectively. The multiplexing circuit 13 multiplexes each of the unique words and each of the identification numbers to the transmission data at a predetermined interval to produce a multiplexer output signal. The error-correcting encoder 14 is connected to the multiplexing circuit 12 and is for carrying out an error-correcting encoding operation in response to the multiplexer output signal to produce an encoder output signal. The modulating section 15 is connected to the error-correcting encoder 14 and is for modulating the encoder output signal by a predetermined digital modulation system such as QPSK and BPSK to produce a local modulated signal having one of the carrier waves that corresponds to one of the identification numbers. Then, the modulating section 15 carries out a frequency-converting operation as regards the local modulated signal to produce a frequency-converted signal within a predetermined transmission frequency band. The frequency-converted signal is supplied through a transmitter output terminal 16 to a transmitting circuit (not shown) which is for transmitting the frequency-converted signal as a modulated signal. Thus, a plurality of modulated signals can be transmitted from the transmitter by the use of a frequency division multiple access system.

Figure 2A:
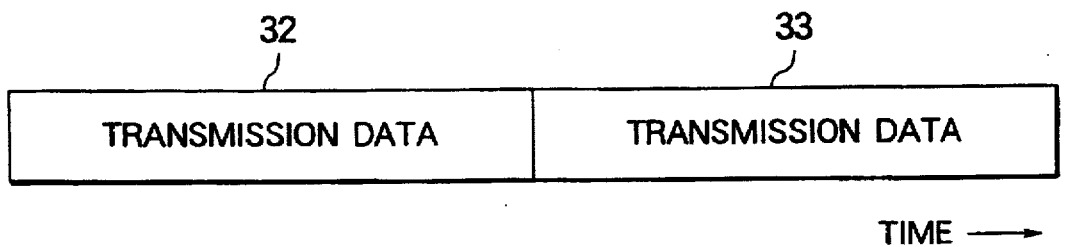
FIGS. 2A and 2B are parts of signal formats for use in describing an operation of the transmitter illustrated in FIG. 1.
Figure 2B:
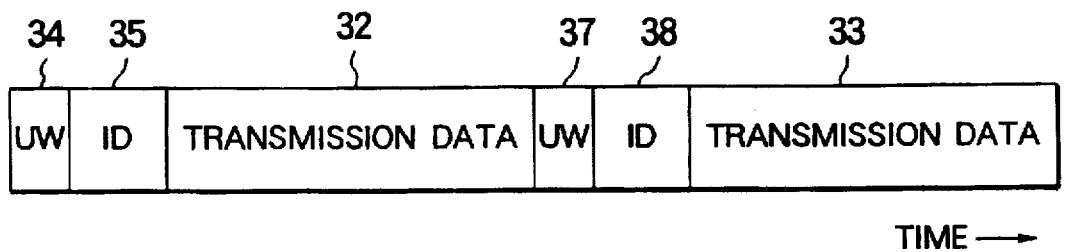

The description will be directed to an operation of the transmitter with reference to signal formats illustrated in FIGS. 2A and 2B. The transmission data comprises a plurality of transmission data parts 32 and 33 time-sequentially combined as schematically illustrated in FIG. 2A. The unique words and the identification numbers are multiplexed to the transmission data parts 32 and 33 as shown in FIG. 2B in which the unique words are denoted by UW and designated by reference numerals 34 and 37 and which the identification numbers are denoted by ID and designated by reference numerals 35 and 38. As a consequence, the signal format of FIG. 2B has a plurality of frames one of which comprises the unique word 34, the identification number 35, and the transmission data part 32 and another of which comprises the unique word 37, the identification number 38, and the transmission data part 33. Thus, the multiplexer output signal has a predetermined frame period. Each of the identification numbers 35 and 38 is specific to a frequency or a channel of a carrier wave which is modulated by the transmission data. Therefore, the identification numbers 35 and 38 are same to each other.

Figure 3:
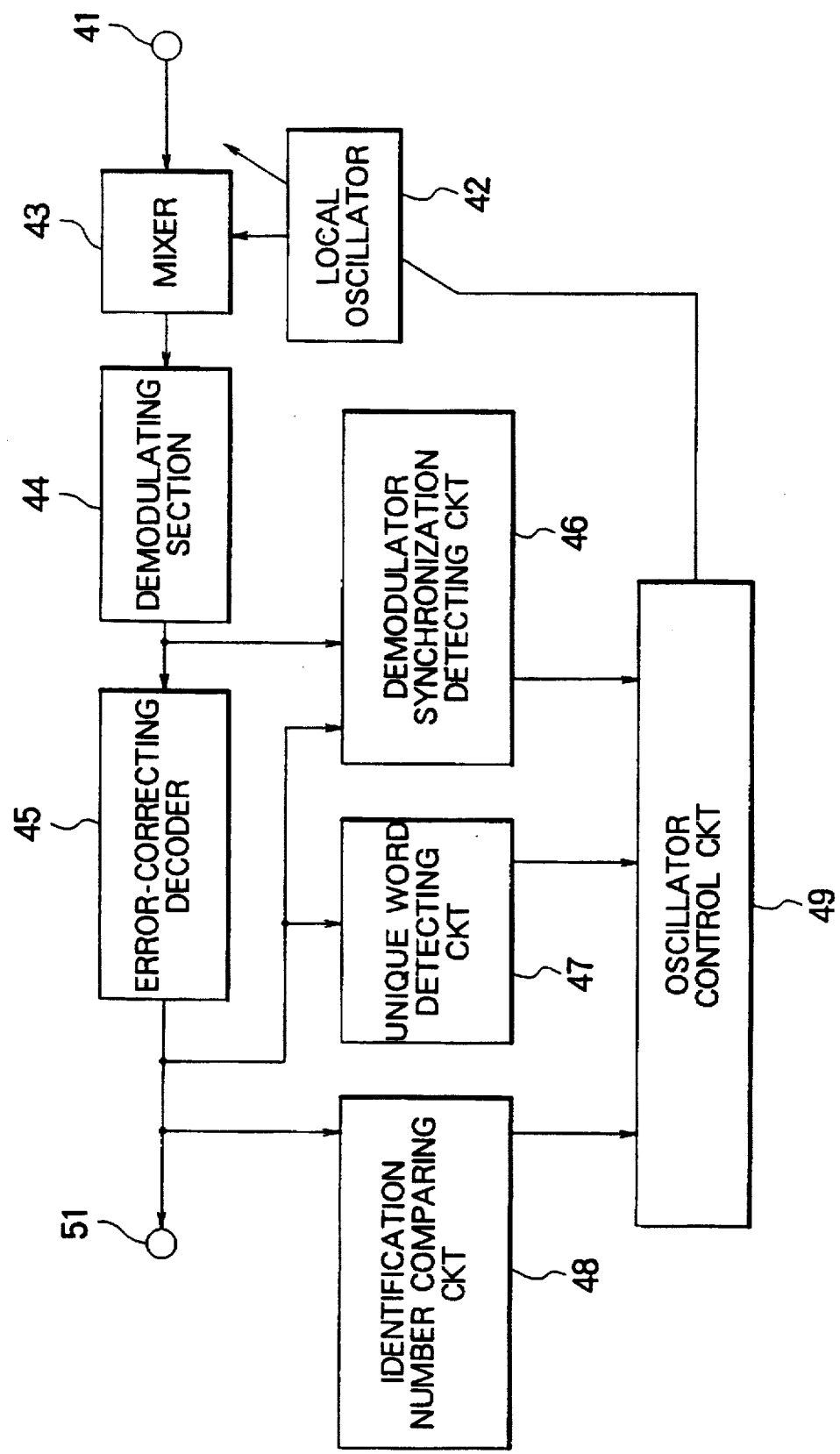
FIG. 3 is a block diagram of a receiver including a demodulator control system according to an embodiment of this invention.

Referring to FIG. 3, the description will now be made as regards a receiver according to an embodiment of the invention. The receiver is for use in combination with the above-mentioned transmitter in the communication system. In the manner which will presently be described, the receiver comprises a receiver input terminal 41, a local oscillator 42, a mixer 43, a demodulator or a demodulating section 44, an error-correcting decoder 45, a demodulator synchronization detecting circuit 46, a unique word detecting circuit 47, an identification number comparing circuit 48, an oscillator control circuit 49, and a local output terminal 51.

The receiver input terminal 41 is for receiving the above-mentioned modulated signals that are transmitted from the transmitter by the use of the frequency division multiple access system. The local oscillator 42 is for carrying out a sweeping operation known in the art. As a result of the sweeping operation, the local oscillator 42 successively produces a plurality of local oscillation frequencies one at a time. Each of the local oscillation frequencies serves as a demodulating frequency.

The mixer 43 is connected to the receiver input terminal 41 and the local oscillator 42 and is for multiplying each of the modulated signals by each of the local oscillation frequencies to convert each of the modulated signals into a mixer output signal having an intermediate frequency. In other words, the mixer 43 carries out a frequency-converting operation as regards each of the modulated signals by the demodulating frequency to produce a frequency-converted signal as the mixer output signal and will be referred to as a frequency-converting arrangement. The demodulating section 44 is connected to the mixer 43 and is for demodulating the mixer output signal into a local demodulated signal. The error-correcting decoder 45 is connected to the demodulating section 44 and is for carrying out an error-correcting and a decoding operation as regards the local demodulated signal to produce a corrected signal which is supplied as a demodulated signal to the local output terminal 51. A combination of the mixer 43, the demodulating section 44, the error-correcting decoder 45 is referred to as a demodulating arrangement for demodulating each of the modulated signals in accordance with the demodulating frequency into the demodulated signal. It is to be noted that the demodulated signal has a transmission data signal representative of the transmission data and has an additional signal carrying one of the unique words and one of the identification numbers.

The demodulator synchronization detecting circuit 46 is connected to the demodulating section 44 and the error-correcting decoder 45 and is for carrying out detection of synchronization of the demodulating section 44 with reference to the local demodulated and the corrected signals to produce a synchronization detection signal when the synchronization is detected. For example, the demodulator synchronization detecting circuit 46 is implemented by a re-encoding synchronization judging circuit described in an article which is contributed by Susumu Otani et al to Institute of Electronics, Information and Communication Engineers in Japan, SAT88-45, 1988 and entitled "Study for Demodulator Acquisition Scheme for a Small Capacity Transmission Systems."

The unique word detecting circuit 47 is connected to the error-correcting decoder 45 and is for detecting each of the unique words in response to the corrected signal to produce a unique word detection signal. The identification number comparing circuit 48 is connected to the error-correcting decoder 45 and is for comparing each of the identification numbers with a desired one of predetermined numbers in response to the corrected signal to produce a number coincidence signal when a current one of the identification numbers coincides with the desired number. The oscillator control circuit 49 is connected to the demodulator synchronization detecting, the unique word detecting, and the identification number comparing circuits 45, 46, and 47 and to the local oscillator 42 and is for producing a control signal to control the sweeping operation of the local oscillator 42 in response to the synchronization detection, the unique word detection, and the number coincidence signals in the manner which will later become clear.

A combination of the demodulator synchronization detecting, the unique word detecting, the identification number comparing circuits 46, 47 and 48 is referred to as a sweeping control arrangement. A combination of the sweeping control arrangement and the local oscillator 42 is referred to as a demodulator control system.

Figure 4:
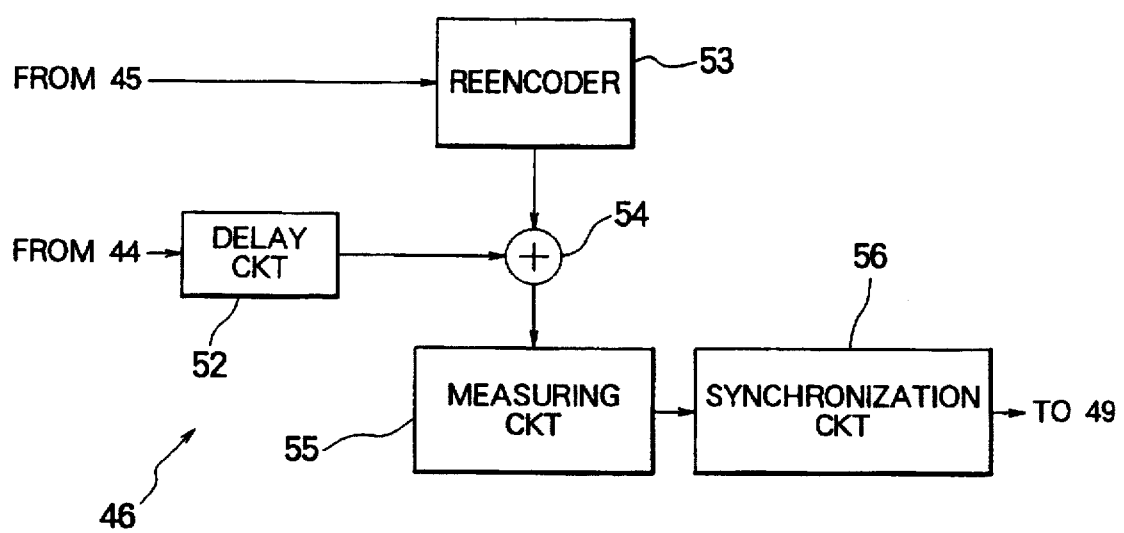
FIG. 4 is a block diagram of a modulator synchronization detecting circuit included in the demodulator control system illustrated in FIG. 3.

Turning to FIG. 4, the description will be made as regards the demodulator synchronization detecting circuit 46. It will be noted that the demodulator synchronization detecting circuit 46 is similar to that described in the above-mentioned article. In the manner which will presently be described, the demodulator synchronization detecting circuit 46 comprises a delay circuit 52, a reencoder 53, an adder 54, a measuring circuit 55, and synchronization circuit 56.

The delay circuit 52 is connected to the demodulating section 44 and is for delaying the local modulated signal to produce a delayed modulated signal. The reencoder 53 is connected to the error-correcting decoder 45 and is for re-encoding the corrected signal into a re-encoded signal. The adder 43 is connected to the delay circuit 52 and the reencoder 53 and is for adding the delayed modulated to the re-encoded signals to produce an addition result signal representative of an estimated error. The measuring circuit 55 is connected to the adder 54 and is for measuring a bit error rate with reference to the estimated error in response to the addition result signal to produce a measured error rate signal representative of the bit error rate. The synchronization circuit 56 is connected to the measuring circuit 55 and is for producing the synchronization detection signal with reference to the bit error rate in response to the measured error rate signal. More particularly, the synchronization circuit 56 judges, when the bit error rate is less than a predetermined allowance level, that synchronization is established in the demodulating section 44.

Figure 5:
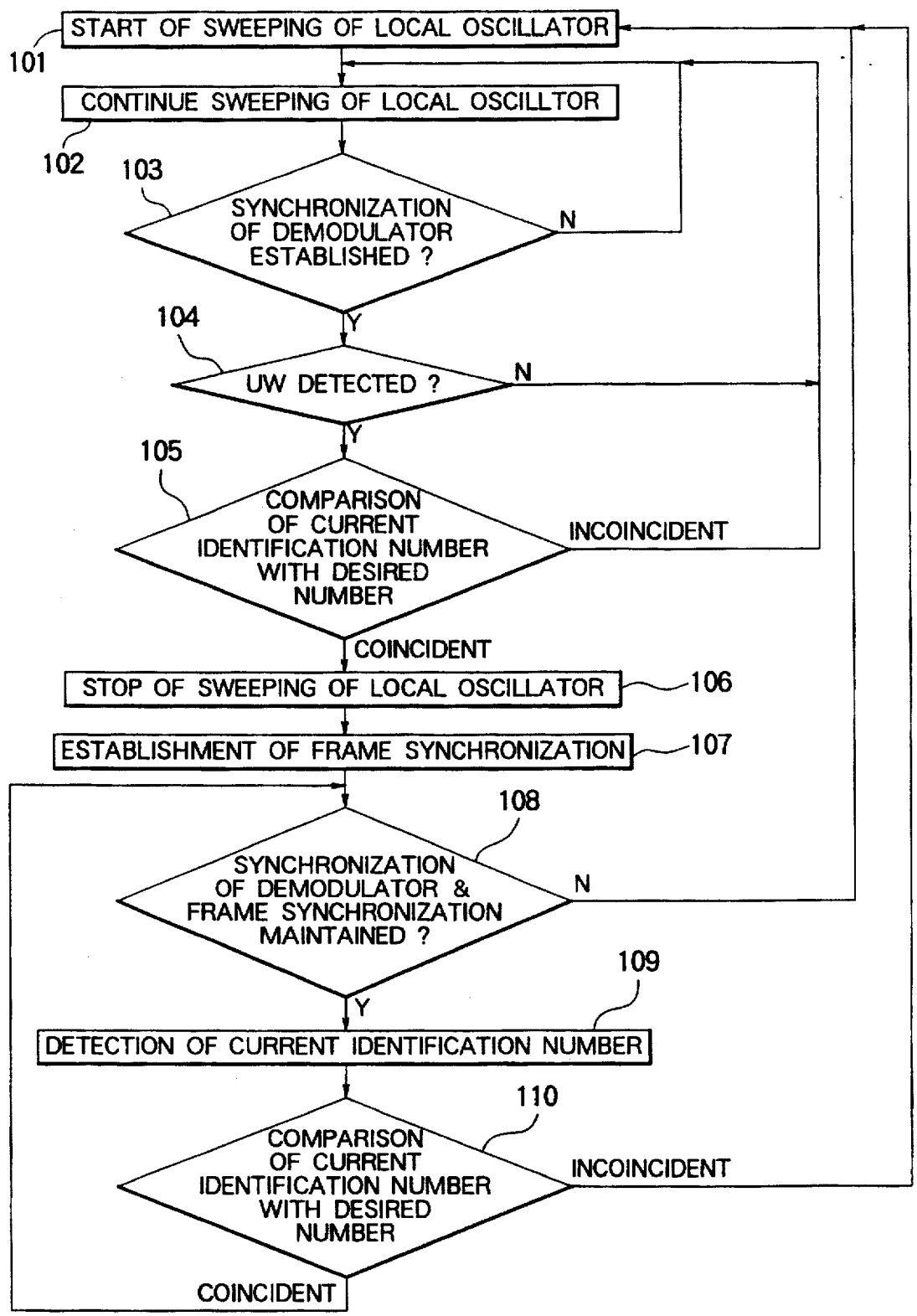
FIG. 5 is a flow chart for describing an operation of the demodulator control system illustrated in FIG. 3.

Referring to FIG. 5 together with FIG. 3, the description will be made as regards an operation of the receiver. At a first stage 101, the local oscillator 42 starts the sweeping operation in response to the control signal to produce an initial one of the local oscillation frequencies. The first stage 101 is followed by a second stage 102 at which the local oscillator 42 continuously sweeps the local oscillation frequencies in order. As a result, the local oscillator 42 successively produces the local oscillation frequencies one at a time. By the use of each of the oscillation frequencies, the mixer 43 frequency-converts each of the modulated signals into the mixer output signal. The mixer output signal is demodulated by the demodulating section 45 into the local demodulated signal. The local demodulated signal is subjected to an error-correcting decoding operation of the error-correcting decoder 45 and then supplied as the corrected signal to the unique word detecting and the identification number comparing circuits 47 and 48. Simultaneously, the corrected signal is supplied to the demodulator synchronization detecting circuit 46.

The second stage 102 is followed by a third stage 103 at which the demodulator synchronization detecting circuit 46 detects whether or not the synchronization between the local modulated signal and the bit timing is established. When the synchronization is not established, the third stage 103 returns to the second stage 102. More particularly, the oscillator control circuit 49 continues the sweeping operation of the local oscillator 23 until the demodulator synchronization detecting circuit 46 produces the synchronization detection signal. When the synchronization is established, the demodulator synchronization detecting circuit 46 produces the synchronization detection signal to supply the synchronization detection signal to the oscillator control circuit 49. At the time instant when the synchronization detection signal is supplied, the oscillator control circuit 49 makes the local oscillator 42 stop the sweeping operation.

Subsequently, the third stage 103 proceeds to a fourth stage 104 at which the unique word detecting circuit 47 checks whether or not the unique word is detected. Herein, a threshold value is given to a correlation value defined by the number of coincident patterns so as to set the number of allowable bit errors in incoincident patterns. On carrying out the fourth stage 104, the oscillator control circuit 49 will be operable as a first checking arrangement.

When the unique word is not detected, the fourth stage 104 returns to the second stage 102. When the unique word is detected, the fourth stage 104 proceeds to a fifth stage 105 at which the identification number comparing circuit 48 compares the current identification number, which is detected following the unique word, with the desired number to detect coincidence or incoincidence therebetween.

Generally, in such a comparator, the number of the allowable bit errors is determined as described above, taking the bit errors resulting from noise into consideration. However, in the identification number comparing circuit 48, those data to be compared are identification numbers. Accordingly, coincidence with the desired number is checked on the basis of coincidence of all of the patterns. On carrying out the fifth stage 105, the oscillator control circuit 49 will be operable as a second checking arrangement. A combination of the first and the second checking arrangements will be referred to as a checking arrangement.

When the current identification number is incoincident with the desired number, the fifth stage 105 returns to the second stage 102 at which the sweeping operation of the local oscillator 23 is immediately restarted to search another one of the modulated signals. The sweeping operation is continued until a desired one of the modulated signal having the desired number is found. When the current identification number is coincident with the desired number, the fifth stage 105 proceeds to a sixth stage 106 at which the oscillator control circuit 49 makes the local oscillator 42 stop the sweeping operation. On carrying out the sixth state 106, the oscillator control circuit 49 will be operable as a stop-making arrangement.

The sixth stage 106 is followed by a seventh stage 107 at which a sequence for establishment of frame synchronization is continuously executed. The seventh stage 107 is followed by an eighth stage 108 at which judgement is made whether or not synchronization of each of the demodulating section 44 and the frame is maintained. Specifically, the oscillator control circuit 49 carries out a monitoring operation about whether or not the synchronization detection, the unique word detection, and the number coincidence signals are continuously supplied thereto and judges whether or not the synchronization is maintained with reference to a result of the monitoring operation. When the demodulator synchronization and the frame synchronization are not maintained, the eighth stage 108 proceeds to the first stage 101 at which the sweeping operation of the local oscillator 43 is restarted from the beginning. When they are maintained, the eighth stage 108 proceeds to a ninth stage 109 at which the identification number comparing circuit 48 detects the current identification number from the corrected signal.

When the current identification number is detected, the ninth stage 109 is followed by a tenth stage 110 at which the identification number comparing circuit 48 compares the current identification number and the desired number to carry out judgement whether or not they are coincident with each other. A result of the judgement is informed to the oscillator control circuit 49.

When the result of judgement indicates incoincidence, the tenth stage 110 returns to the first stage 101 at which the oscillator control circuit 49 restarts the sweeping operation of the local oscillator 43 from the beginning. When the result of judgement indicates coincidence, the tenth stage 110 returns to the eighth stage 108.

What is claimed is:

1. A demodulator control system for controlling operation of demodulating means which is for demodulating each of a plurality of modulated signals in accordance with a demodulating frequency into a demodulated signal, said modulated signals being transmitted by the use of a frequency division multiple access system, said demodulator control system including a local oscillator for carrying out a sweeping operation to successively produce, as said demodulating frequency, a plurality of local oscillation frequencies one at a time and sweeping control means for controlling said sweeping operation with reference to said demodulated signal, said demodulated signal carrying a unique word and an identification number, said sweeping control means comprising:

a number comparing circuit connected to said demodulating means for comparing said identification number with a desired one of predetermined numbers in response to said demodulated signal to produce a number coincidence signal when said identification number coincides with said desired one;

a unique word detecting circuit connected to said demodulating means for detecting said unique word in response to said demodulated signal to produce a unique word detection signal; and an oscillator control circuit connected to said local oscillator, said number comparing circuit, and said unique word detecting circuit for controlling said sweeping operation in response to presence and absence of each of said number coincidence signal and said unique word detection signal.

2. A demodulator control system as claimed in claim 1, wherein said demodulating means comprises:

frequency-converting means supplied with said modulated signals and connected to said local oscillator for frequency-converting each of said modulated signals by said demodulating frequency into a frequency-converted signal;

a demodulating section connected to said frequency-converting means for demodulating said frequency-converted signal into a local demodulated signal; and error-correcting means connected to said demodulating section, said number comparing circuit, and said unique word detecting circuit for carrying out an error-correcting operation as regards said local demodulated signal to produce a corrected signal which is supplied as the first-mentioned demodulated signal to each of said number comparing circuit and said unique word detecting circuit.

3. A demodulator control system as claimed in claim 2, wherein said sweeping control means further comprises a synchronization detecting circuit connected to said demodulating section and said error-correcting means for detecting synchronization of said demodulating means with reference to the first-mentioned and said local demodulated signals to produce a synchronization detection signal.

4. A demodulator control system as claimed in claim 3, wherein said oscillator control circuit comprises:

stop-making means connected to said local oscillator and said synchronization detecting circuit for making a stop of said sweeping operation in response to said synchronization detection signal; and checking means connected to said number comparing circuit, said unique word detecting circuit, and said stop-making means for checking whether or not each of said number coincidence signal and said unique word detection signal is present, said checking means releasing said stop of the sweeping operation only when at least one of said number coincidence signal and said unique word detection signal is absent.

5. A demodulator control system as claimed in claim 4, wherein said checking means comprises:

first checking means connected to said unique word detecting circuit and said stop-making means for checking whether or not said unique word detection signal is present, said first checking means releasing said stop of the sweeping operation only when said unique word detection signal is absent; and second checking means connected to said number comparing circuit and said stop-making means for checking whether or not said number coincidence signal is present, said second checking means releasing said stop of the sweeping operation only when said number coincidence signal is absent.

6. A receiver for receiving a plurality of modulated signals which are transmitted by the use of a frequency division multiple access system, including a local oscillator for carrying out a sweeping operation to successively produce, as a demodulating frequency, a plurality of local oscillation frequencies one at a time, demodulating means for demodulating each of said modulated signals in accordance with said demodulating frequency into a demodulated signal, and sweeping control means for controlling said sweeping operation with reference to said demodulated signal, said demodulated signal carrying a unique word and an identification number, said sweeping control means comprising:

a number comparing circuit connected to said demodulating means for comparing said identification number with a desired one of predetermined numbers in response to said demodulated signal to produce a number coincidence signal when said identification number coincides with said desired one;

a unique word detecting circuit connected to said demodulating means for detecting said unique word in response to said demodulated signal to produce a unique word detection signal; and an oscillator control circuit connected to said local oscillator, said number comparing circuit, and said unique word detecting circuit for controlling said sweeping operation in response to presence and absence of each of said number coincidence signal and said unique word detection signal.

7. A receiver as claimed in claim 6, wherein said demodulating means comprises:

frequency-converting means supplied with said modulated signals and connected to said local oscillator for frequency-converting each of said modulated signals by said demodulating frequency into a frequency-converted signal;

a demodulating section connected to said frequency-converting means for demodulating said frequency-converted signal into a local demodulated signal; and error-correcting means connected to said demodulating section, said number comparing circuit, and said unique word detecting circuit for carrying out an error-correcting operation as regards said local demodulated signal to produce a corrected signal which is supplied as the first-mentioned demodulated signal to each of said number comparing circuit and said unique word detecting circuit.

8. A receiver as claimed in claim 7, wherein said sweeping control means further comprises a synchronization detecting circuit connected to said demodulating section and said error-correcting means for detecting synchronization of said demodulating means with reference to the first-mentioned and said local demodulated signals to produce a synchronization detection signal.

9. A receiver as claimed in claim 8, wherein said oscillator control circuit comprises:

stop-making means connected to said local oscillator and said synchronization detecting circuit for making a stop of said sweeping operation in response to said synchronization detection signal; and checking means connected to said number comparing circuit, said unique word detecting circuit, and said stop-making means for checking whether or not each of said number coincidence signal and said unique word detection signal is present, said checking means releasing said stop of the sweeping operation only when at least one of said number coincidence signal and said unique word detection signal is absent.

10. A receiver as claimed in claim 9, wherein said checking means comprises:

first checking means connected to said unique word detecting circuit and said stop-making means for checking whether or not said unique word detection signal is present, said first checking means releasing said stop of the sweeping operation only when said unique word detection signal is absent; and second checking means connected to said number comparing circuit and said stop-making means for checking whether or not said number coincidence signal is present, said second checking means releasing said stop of the sweeping operation only when said number coincidence signal is absent.

* * * * *